United States Patent [19]

Buxton

[11] Patent Number: 4,585,189
[45] Date of Patent: Apr. 29, 1986

[54] COUNTERBALANCED COWLING ASSEMBLY FOR A PYLON-MOUNTED ENGINE AND NACELLE THEREFOR

[75] Inventor: John A. Buxton, Westminister, Calif.

[73] Assignee: Lockheed Corporation, Burbank, Calif.

[21] Appl. No.: 663,660

[22] Filed: Oct. 22, 1984

[51] Int. Cl.[4] .............................................. B64D 27/00
[52] U.S. Cl. ....................................... 244/54; 49/113; 244/129.4
[58] Field of Search .................... 244/53 R, 54, 129.4, 244/129.5, 110 B; 49/111, 112, 113, 40

[56] References Cited

U.S. PATENT DOCUMENTS

| | | | |
|---|---|---|---|
| 1,455,607 | 5/1923 | DuBois | 49/113 |
| 1,824,679 | 9/1931 | Morris | 49/113 |
| 3,541,794 | 4/1969 | Johnston et al. | 60/226 |
| 3,604,662 | 9/1971 | Nelson, Jr. et al. | 244/53 R |
| 4,044,973 | 8/1977 | Moorehead | 244/54 |
| 4,399,966 | 8/1983 | Crudden et al. | 244/129.4 |

*Primary Examiner*—Galen L. Barefoot
*Assistant Examiner*—Lynn Fiorito
*Attorney, Agent, or Firm*—Louis L. Dachs

[57] ABSTRACT

The invention is a counterbalanced bifurcated cowling assembly for a pylon-mounted engine and nacelle therefor, the pylon 16 extending, generally, horizontally from the fuselage 15 of the aircraft 10. The assembly comprises a first cowling section 18 pivotally attached to the pylon 16 which is rotatable from a closed position partially extending about the upper side of the engine 12 to an open position above the engine. A second cowling section 19 is pivotally attached to the pylon 16 and rotatable from a closed position about the underside of the engine 12 to an open position extending downward from the engine. A hydraulic cylinder 40 having an output drive shaft 42 is at least partially mounted within the pylon 16. A pair of first link 44A, 44B are pivotally attached by their first ends 45A, 45B to the end 46 of the output drive shaft 42 and pivotally attached by their second ends 60A, 60B to the first cowling section 18. A pair of second links 48A, 48B are also pivotally attached by their first ends 50A, 50B to the end 46 of the output drive shaft 42 and pivotally attached by their second ends 64A, 64B to the second cowling section 19. Thus, upon the extension of the output drive 42, the first and second cowling sections 18, 19 are rotated upward and downward, respectively, with their respective weights counteracting each other during movement from the closed position to the open position.

7 Claims, 5 Drawing Figures

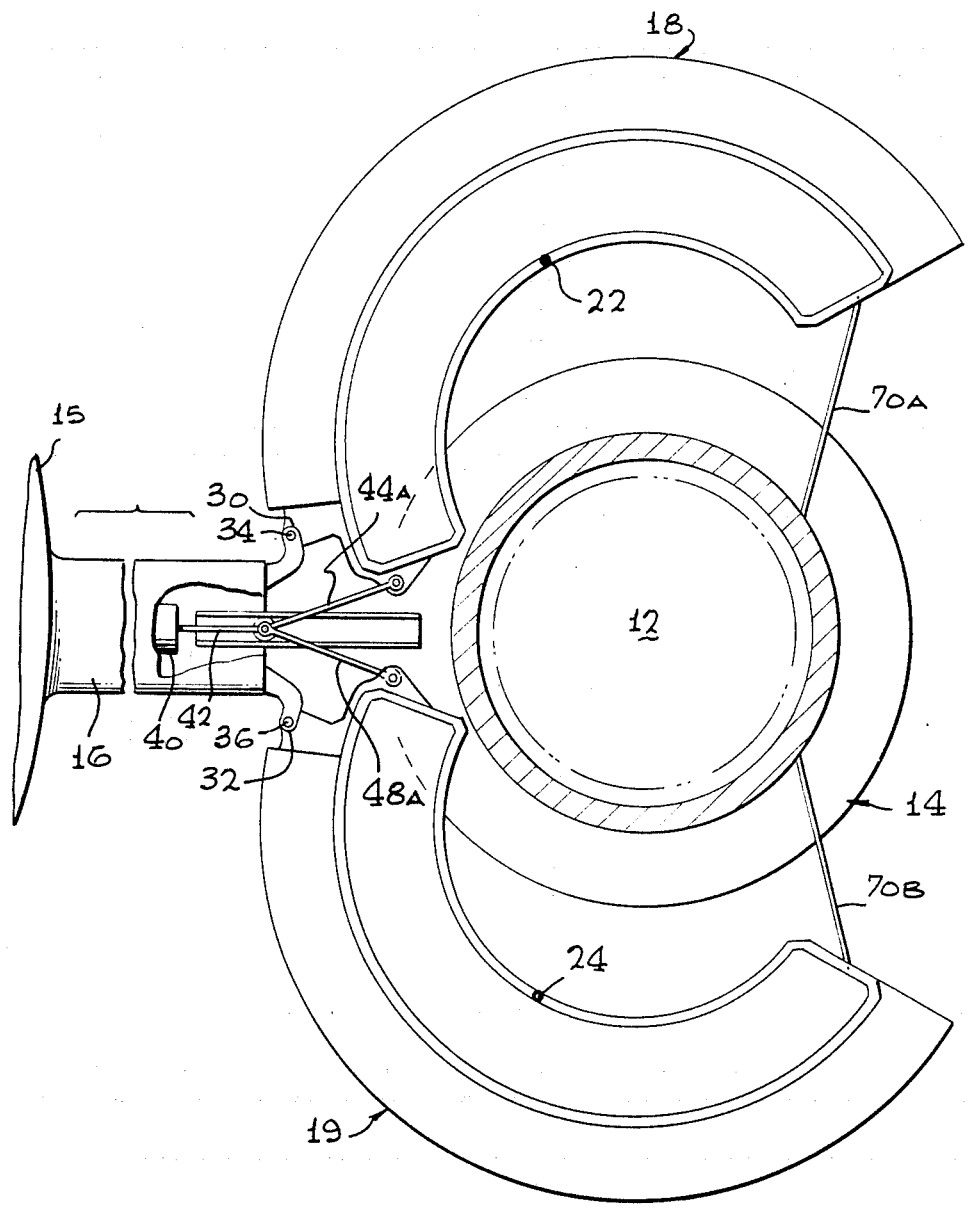

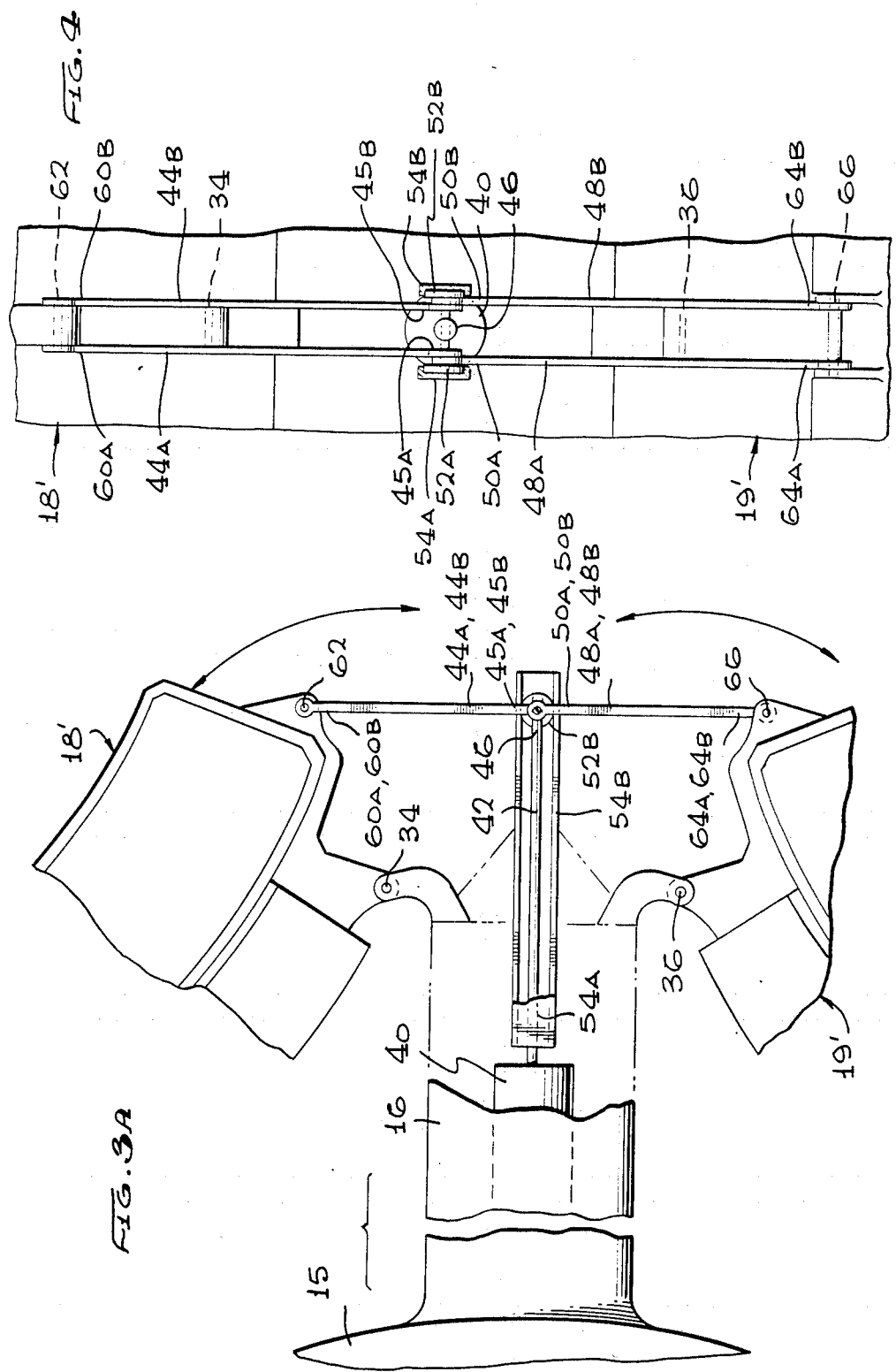

COUNTERBALANCED COWLING ASSEMBLY FOR A PYLON-MOUNTED ENGINE AND NACELLE THEREFOR

TECHNICAL FIELD

The invention relates to the field of jet engine nacelles and, in particular, access cowling thereto.

BACKGROUND INFORMATION

In general, most pylon-mounted jet engine nacelles, whether mounted on the wing or fuselage, have numerous panels or cowlings that can be opened to gain access to the engine and its accessories. They are typically light-weight, contoured panels of sheet-metal construction that are pivotally attached to the nacelle structure or pylon. Usually, manually extendable support rods are provided to hold the cowling in the open position. If the cowling is large, and/or the weight of the cowling is high, an opening and closing hydraulic actuation system may be incorporated. A typical hydraulic system for opening and closing cowling on a jet engine nacelle can be found in U.S. Pat. No. 4,399,966, "Power Opening System for Engine Cowl Doors" by E. H. Cruden et al. In this system, each cowling section is controlled by a separate hydraulic actuator.

On aircraft such as the McDonnell Douglas DC-10, with high-bypass ratio fan-jet engines, the thrust reversers are mounted in the fan duct. In such engine and nacelle combinations, the thrust reversers are sometimes incorporated into the engine access cowling. For example, in U.S. Pat. No. 3,541,794, "Bifurcated Fan Duct Thrust Reverser" by E. A. Johnson et al., the thrust reversing mechanisms are in cowling halves hingeably connected to the engine pylon. These cowling/thrust reverser combinations weigh in at several hundred pounds. Since they are hinged at the top of the nacelle and rotated outward and upward to obtain access to the engine, non-assisted opening is difficult to accomplish. Thus, a hydraulic actuation system of the type previously mentioned is incorporated. Combining the cowling and thrust reverser into one assembly has significant advantages, mainly a weight reduction and ease of maintenance.

This particular design is readily adaptable to an under-wing mounted engine or one mounted in the tail of an aircraft. If, however, the engine and nacelle are mounted to the side of the fuselage by means of a pylon, such as on the McDonnell Douglas DC-9 or the Boeing Aircraft Corporation 727, it is not possible to provide cowling which opens on the side of the engine next to the fuselage due to interference therewith. Additionally, a hydraulic system of the type as set forth in U.S. Pat. No. 4,399,966, "Power Opening System for Engine Cowl Doors" by E. H. Crudden et al. now becomes quite large and heavy, in that each hydraulic cylinder must react the total weight of the cowling half.

Therefore, it is a primary object of the subject invention to provide a system for opening and closing cowling sections mounted about a jet engine and nacelle therefor which are pylon mounted to the fuselage of the aircraft.

It is another object of the subject invention to provide a powdered system for simultaneously opening engine nacelle cowling sections upward and downward to obtain access to the engine and its accessories.

It is a further object of the subject invention to provide a cowling assembly wherein the weight of the power system used to open and close the cowling sections is at a minimum.

It is a still further object of the subject invention to provide a cowling assembly wherein cowling sections are counterbalanced.

DISCLOSURE OF INVENTION

The invention is a counterbalanced bifurcated cowling assembly for a pylon-mounted engine and nacelle therefor, the pylon extending, generally, horizontally from the fuselage of the aircraft. The assembly has a first cowling section pivotally attached to the pylon, which is rotatable from a closed position partially extending about the upper side of the engine to an open position above the engine. Also, a second cowling section is pivotally attached to the pylon and rotatable from a closed position about the underside of the engine to an open position extending downward from the engine. A linear actuator having an output drive shaft is at least partially mounted within the pylon. At least one first link, having first and second ends, is pivotally attached at its first end to the end of the output drive shaft, and at its second end it is pivotally attached to the first cowling section. At least one second link having first and second ends is also pivotally attached by its first end to the end of the output drive shaft and, at its second end, pivotally attached to the second cowling section.

Thus, upon the extension of the output drive shaft, the first and second cowling sections are rotated upward and downward, respectively, with their respective weights counteracting each other during movement from the closed position to the open position and visa versa.

Additionally, a pair of guide tracks is mounted to the pylon, one such track extending along either side of the output drive shaft. A pair of rollers is rotatably mounted on the output drive shaft on either side thereof. Each roller is also in rolling contact with the guide tracks on the same side. The first and second links are pivotally attached to the output drive shaft between the output drive shaft and the rollers.

The novel features which are believed to be characteristic to the invention, both as to its organization and method of operation, together with further objects and advantages thereof, will be better understood from the following description connected with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a top view of a engine and nacelle therefor pylon mounted to the side of an aircraft fuselage with the cowling in the closed position.

Illustrated in FIG. 2 is a front view of the engine and nacelle shown in FIG. 1 and taken along the line 2—2 with the cowling in the partially open position.

Figure 1:
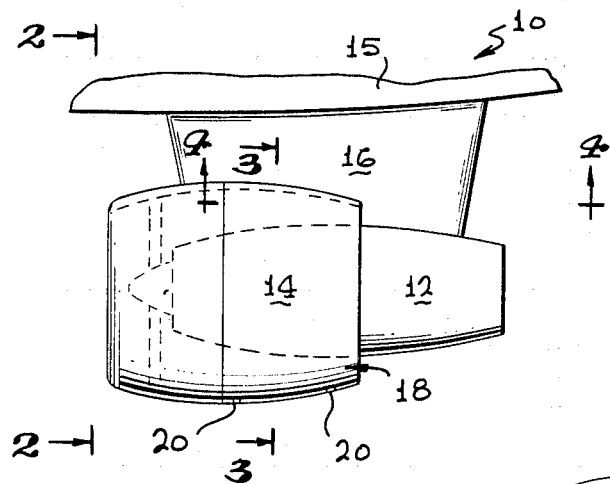

Illustrated in FIG. 3 is an enlarged, cross-sectional view of the pylon-mounted engine and nacelle in schematic form shown in FIG. 1 and taken along the line 3—3 with the cowling in the fully opened position.

Illustrated in FIG. 3A is an enlarged, partial cross-sectional view of the pylon-mounted engine and nacelle in schematic form shown in FIG. 1 and taken along the line 3—3 with the cowling in the fully opened position.

Illustrated in FIG. 4 is an enlarged, partial cross-sectional view of the pylon-mounted engine and nacelle in schematic form shown in FIG. 1 and taken along the line 4—4.

BEST MODE FOR CARRYING OUT THE INVENTION

Figure 2:
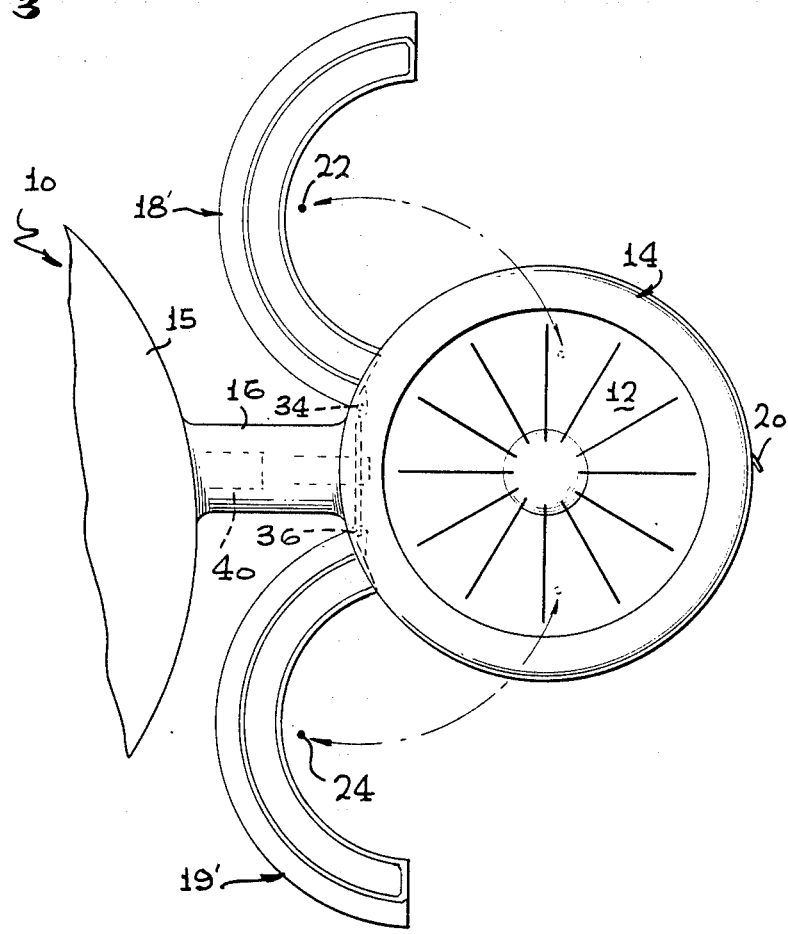

Illustrated in FIGS. 1 and 2, are top and front views of an engine and nacelle therefor, pylon mounted on the side of the fuselage of an aircraft. The aircraft, generally designated by numeral 10, is similar to a McDonnell Douglas DC-9 or Boeing Aircraft 727-type aircraft, in that high bypass ratio, fan-jet engines 12 are installed within a nacelle 14 mounted to the fuselage 15 via a pylon 16.

In high bypass-type fan-jet engines, the majority of the thrust is produced by the fan. Thus, the thrust reversers (not shown) are usually mounted in the nacelle 14. This is clearly seen in U.S. Pat. No. 3,541,794, "Bifurcated Fan Duct Thrust Reverser" by E. A. Johnson et al. Here, a pair of cowling sections are hingeably connected to the aircraft supporting structure, for rotation between an open position, providing ready access to the core of the engine and, a closed position, wherein the cowling sections surround the engine downstream of the fan duct and form a fan exhaust nozzle. The thrust reversers essentially block the fan flow and divert the flow through flow-reversing cascades carried in the outer wall of each cowling section.

In the subject invention, the thrust reversers, as described above, are also incorporated into the first and second cowling sections 18 and 19. But in this case, since the engine is mounted to the fuselage, upper cowling section 18 opens upward, while second lower cowling section 19 opens downward. The upper cowling section and lower cowling section in the fully open position are designated by numerals 18' and 19', respectively. In the closed position they are latched in place by a latch assembly 20 (details are not shown). The center of gravity of cowling sections 18 and 19 are indicated by numerals 22 and 24, respectively.

Still referring to FIGS. 1 and 2 and, additionally, to FIGS. 3, 3A, and 4, it can be seen that the upper cowling section 18 is pivotally attached to the pylon 16 by means of a plurality of hinge members 30 (only one is shown), while the lower cowling section 19 is pivotally attached to a plurality of hinge members 32 (only one is shown). Thus, the upper cowling section 18 and lower cowling section 19 are rotatable about pivot axis 34 and 36, respectively. A linear actuator, such as hydralic cylinder 40, is mounted within the pylon 16, having an output drive shaft 42 extendable toward the engine 12. The linear actuator could also be electrically, air, or hand powered.

A first pair of links 44A and 44B are pivotally attached by their first ends 45A and 45B on either side of the end 46 of the drive shaft 42. A second pair of links 48A and 48B are also pivotally attached by their first ends 50A and 50B to either side of the end 46 of the drive shaft 42 outboard of links 44A and 44B. Rotatably mounted at the end 46 of the drive shaft 42, outboard of the links 44A and 44B and 48A and 48B are rollers 52A and 52B which ride in pylon-mounted, parallel guide tracks 54A and 54B, respectively, on either side of the hydraulic cylinder 40. The rollers and guide tracks provide additional support for the hydraulic cylinder 40 and absorb loads from the cowling sections in a manner to be subsequently discussed.

The second ends 60A and 60B of links 44A and 44B are pivotally attached to the cowling section 18 at pivot axis point 62 outboard of the pivot axis 34. The second end 64A and 64B of the links 48A and 48B are pivotally attached to the lower cowling section 19 at pivot axis point 66 outboard of the pivot axis 36.

Thus, with the upper and lower cowling sections 18 and 19 in the closed and unlatched position, extension of the output drive shaft 42 will cause the cowling sections 18 and 19 to rotate from the closed position to the open position (18' and 19') wherein the center of gravities 22 and 24, respectively, are inboard the links 44A and 44B and 48A and 48B, respectively. Thus, the lower cowling sections 19 tendency to move downward to the open position is counteracted by the weight of upper cowling sections 18 tendency to remain in the closed position. These forces tend to balance each other out, thus, reducing the size and weight of the hydraulic cylinder 40 and related drive linkages. There is also an added safety feature, i.e., should the lower cowling section 19 become unlatched and "drop", its movement will be reacted (and thus slowed) by the movement of the upper cowling section 18. While each cowling section 18 and 19 is coupled to the hydraulic cylinder 40 by a pair of links, there may be applications where the loads and design requirements will require only one link for each cowling section.

Particularly referring to FIG. 3, for safety purposes, especially in high winds, retractable struts 70A and 70B can be provided to prevent movement of the cowling sections 18 and 19 in conjunction with the locking action that is provided by the hydrauclic cylinder 40.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention is applicable to jet engine nacelles for aircraft and particularly to engine nacelles pylon mounted to the fuselage of the aircraft.

What is claimed is:

1. A counterbalanced bifurcated cowling assembly for a pylon-mounted engine and nacelle therefor, the pylon extending horizontally from the fuselage of an aircraft comprising:

a first cowling section pivotally mounted to the pylon and rotatable from a closed position extending partially about the top of the engine to an open position above the engine;

a second cowling section pivotally mounted to the pylon and rotatable from a closed position extending partially about the underside of the engine to an open position extending downward from the engine;

an actuator at least partially mounted within the pylon, said actuator having an output drive shaft;

at least one first link having first and second ends, said first end of said at least one first link pivotally attached to said output drive shaft and said second end of said at least one first link pivotally attached to said first cowling section; and at least one second link having first and second ends, said first end of said second link pivotally attached to said output shaft and said second end of said at least one second link pivotally attached to said second cowling section;

such that upon the extension of the output drive shaft, the first and second cowling sections are rotated upward and downward, respectively, with their respective weights counteracting each other during movement from the closed position to the open position.

2. The cowling assembly as set forth in claim 1 further comprising:

guide track means mounted to the pylon, extending along said output drive shaft; and a pair of rollers rotatably mounted to said output drive shaft on either side thereof, each one of said pair of rollers in rolling contact with said guide track means.

3. The cowling assembly as set forth in claim 2 wherein said guide track means comprises:

a pair of guide tracks mounted to the pylon, extending along either side of said output drive shaft; and each one of said pair of rollers in rolling contact with one of said pair of guide tracks.

4. The cowling assembly as set forth in claim 3 wherein said at least one first and second links extend substantially perpendicular to said output drive shaft when said first and second cowling sections are in the open position.

5. The cowling assembly as set forth in claim 4 wherein there are:

two first links having their first ends attached to said output drive shaft on opposite sides thereof between said ouput shaft and said rollers; and two second links having their first ends attached to said output drive shaft on opposite sides thereof between said drive shaft and said rollers.

6. The cowling assembly as set forth in claim 5 including said first and second cowling sections centers of gravity, said first and second links being inboard of said centers of gravity when said cowling sections are in the closed position and on the outboard side of said centers of gravity when said cowling sections are in the open position.

7. The cowling assembly as set forth in claim 6 wherein said actuator is a hydraulic actuator.

* * * * *